United States Patent
Smiley

[11] 3,808,557
[45] Apr. 30, 1974

[54] HIGH-SENSITIVITY LASER ACOUSTIC DETECTOR

[76] Inventor: Vern N. Smiley, 1040 Bowman Dr., Reno, Nev. 89503

[22] Filed: May 21, 1971

[21] Appl. No.: 145,978

[52] U.S. Cl. ....... 332/7.51, 331/94.5 A, 181/.5 AP, 73/71.1, 356/106
[51] Int. Cl. .............................................. H01s 3/05
[58] Field of Search............... 332/7.51; 331/94.5 H; 181/.5 AP; 73/71.1; 340/3 A; 356/106, 256

[56] References Cited
UNITED STATES PATENTS

| | | |
|---|---|---|
| 3,563,664 | 2/1971 | Campbell et al. ................... 356/106 |
| 3,409,370 | 11/1968 | King et al. ............................ 356/51 |
| 3,476,483 | 11/1969 | Weeks ................................. 356/256 |
| 3,326,078 | 6/1967 | Clarke et al. ......................... 73/71.3 |
| 3,559,102 | 1/1971 | Atsufumi et al. ................... 332/7.51 |
| 3,605,039 | 9/1971 | Harris et al. .................... 331/94.5 A |

FOREIGN PATENTS OR APPLICATIONS

| | | |
|---|---|---|
| 193,026 | 5/1970 | Great Britain ..................... 332/7.51 |

*Primary Examiner*—Maynard R. Wilbur
*Assistant Examiner*—N. Moskowitz
*Attorney, Agent, or Firm*—R. S. Sciascia; G. J. Rubens; J. W. McLaren

[57] ABSTRACT

A laser assembly having an active portion and at least one passive portion as defined by optically resonant cavities included between spaced reflective surfaces is tuned so as to operate in two axial modes producing two different frequencies of laser energy. Any change in the optical length of the passive optically resonant cavity causes a concomitant change in one of the two frequencies produced by the laser assembly. Thus, sound waves intercepted by the passive resonant cavity portion of the assembly cause a change in its effective optical length and a resultant concomitant change in the second frequency produced. When the two frequencies are hetrodyned the beat frequency which is developed is a function of the amplitude of the intercepted sound waves and can be converted into an appropriate signal by a photo-responsive device. Changes in the frequency are suitably detected and indicated for display or recording. The optical length of the passive resonant cavity is changed in response to sound waves intercepted transversely to its long axis as a result of a change of the index of refraction in the medium between the spaced reflective surfaces of the passive resonant cavity; alternatively, acoustic energy in the form of sound waves impinging upon one of the reflective surfaces will cause it to be slightly displaced along the major axis of the assembly thus physically changing the optical length of the passive resonant cavity with a consonant change in the second frequency produced by the two mode operation of the laser assembly.

4 Claims, 5 Drawing Figures

PATENTED APR 30 1974 3,808,557
SHEET 1 OF 2
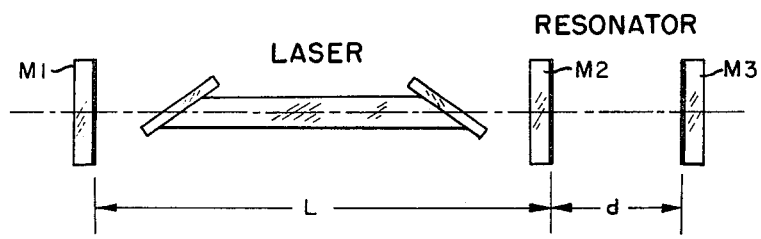
FIG. I
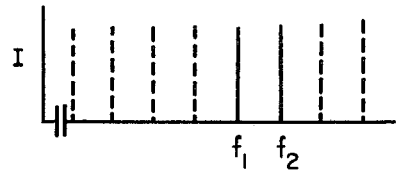
FIG. 2(a)
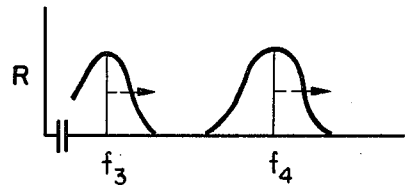
FIG. 2(b)
INVENTOR.
VERN N. SMILEY

HIGH-SENSITIVITY LASER ACOUSTIC DETECTOR

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

In the prior art acoustic sensing devices generally relied upon electromagnetic or piezoelectric devices which operate to convert sound energy directly into electrical energy by performing a transducer function. Such devices are susceptible to a variety of disadvantages among which is the inability to accurately and reliably transduce weak acoustic signals, particularly in the presence of interferring ambient acoustic noise signals in any of a number of forms. Accordingly, it is highly desirable that an acoustic sensor have a high degree of sensitivity, particularly to weak acoustic signals which may be of insufficient amplitude and energy to drive a prior art type of electromechanical transducer. The present invention is an extremely high sensitivity device having the capability of accurately, rapidly, and reliably detecting an effective change of optical length of the order of $10^{-3}$ A and marks a significant contribution to the acoustic sensor art.

SUMMARY OF THE INVENTION

The present invention comprises a multi-cavity laser assembly having an active portion and at least one passive portion as defined by spaced reflective surfaces. The present invention may be practiced in embodiments having several passive resonant cavities, but in its most fundamental form may consist of a three mirror, two resonant cavity, laser assembly with three mirrors $M_1$, $M_2$, $M_3$, disposed along a common axis in spaced relationship. The active resonant cavity may be defined by mirrors $M_1$ and $M_2$ and is so designated because it is designed to receive a laser material which is capable, upon energization, of actively producing laser energy output. The laser material may consist of a selected one of a number of known gas, liquid, or solid laser substances capable of laser energy emission under the proper conditions.

In accordance with the concept of the present invention, the laser material is placed in the longer of the two resonant cavities. When suitably energized, the laser material functions in the manner of a conventional laser oscillator, operating in a continuous wave mode.

The third mirror $M_3$ spaced from the middle mirror, $M_2$, which has a partially reflective surface forms another resonant optical cavity which is shorter than the active resonant cavity between mirrors $M_1$ and $M_2$. The resonant cavity between mirrors $M_2$ and $M_3$ is passive in the sense that no laser energy or emission is originated within it, but it coacts with the active resonant cavity so that the laser assembly may be adjusted to operate in two modes producing two separate and distinct frequencies. Moreover, the passive cavity when properly tuned and adjusted interacts with the active resonant cavity in a manner such that, when the effective optical path length between the reflective surfaces $M_2$ and $M_3$ defining the passive resonant cavity is changed, the operating frequency of one of the two laser modes is commensurately changed.

The resultant effect is the production of the laser beam containing two frequencies with the difference frequency between the two frequencies of the two laser modes being variable in response to changes in the effective optical path length of the passive resonant cavity between mirrors $M_2$ and $M_3$ where the optical path length $nd$ is determined by the index of refraction $n$ of the medium between the mirrors $M_2$ and $M_3$ and $d$ is the physical distance between the mirrors $M_2$ and $M_3$. Any change, however slight, in either $n$ or $d$ will shift the laser mode frequency by a determinable amount which can be accurately calculated for any particular set of cavity lengths.

Acoustic energy in the form of a sound wave when passing through a medium induces changes in the index of refraction. When such a sound wave passes through the passive resonant cavity transversely to its long axis, periodic changes will be produced in its optical length and hence periodic changes will occur in the laser mode separation frequency. These changes in frequency can then be detected, preferably by optical-electronic means, and provide an extremely high sensitivity output which is a function of the instantaneous amplitude of the sound wave intercepted by the passive portion of the laser assembly of the present invention.

The concept of the present invention may also be practiced by arranging that the laser assembly is so disposed that acoustic energy in the form of sound waves is intercepted by the passive resonant cavity by impinging on the end mirror $M_3$ in a direction substantially along the major axis of the laser assembly. In this manner of employing the concept of the present invention, the mirror $M_3$ will be caused to vibrate periodically responsive to pressure variations in the sound wave impinging thereon and will produce periodic variations in the distance $d$ and hence periodic variations in the mode separation frequency which, as in the manner of the use of the invention described hereinbefore, may be readily detected by conventional electronic means to provide an output as an extremely high sensitivity measure of the acoustic energy intercepted by the mirror $M_3$ effectively changing the optical length of the passive resonant cavity between the mirrors $M_2$ and $M_3$.

In both the above described methods of employing the present invention the varying mode separation frequency may be converted to a varying radio frequency which is the beat frequency between the two modes by mixing the laser beam appropriately, employing a square-law photo detector, such as a photo-multiplier or a photo-diode, for example. The detector output signal is a function of the beat frequency and may be connected to a tunable radio frequency receiver having a frequency-sensitive circuit such as a discriminator or ratio detector. The output produced by the frequency-sensitive circuit may then be connected to an AC meter, a cathode ray oscilloscope, panoramic receiver or other suitable readout indicator device.

The nominal beat frequency is dependent upon the distance between the mirrors $M_1$ and $M_2$ which define the active resonant cavity. For a separation difference of one meter between mirrors $M_1$ and $M_2$, the beat frequency would be approximately 150 MHz. The variations in one of the frequency modes produced by acoustic energy in the form of sound waves being intercepted by and acting upon the passive resonant cavity cause frequency deviations about the center frequency of approximately 150 MHz which are, in turn, detected as voltage amplitude variations in the frequency-sensitive device, such as a discriminator or ratio detector. The frequency of the fluctuations in the output is the same as the frequency of the original sound wave and accordingly the final output signal amplitude is a function of the input sound wave intensity.

Accordingly, it is a primary object of the present invention to provide an improved acoustic sensor of extremely high sensitivity.

An equally important object of the present invention is to provide such a high sensitivity acoustic detector which is not dependent upon energy transducing phenomena for producing its measurable result.

Another most important object of the present invention is the unique employment of optical techniques for detecting acoustic waves in either transparent or opaque media.

These and other features, objects, and advantages of the present invention will be better appreciated from an understanding of a preferred embodiment of the new device as disclosed in the following description and as illustrated in the accompanying drawings.

BRIEF DESCRIPTION OF THE DRAWINGS

In the drawings:

FIG. 1 is a schematic illustration of a laser assembly employed in accordance with the concept of the present invention;

FIGS. 2a and 2b are graphical illustrations of the resonant frequency characteristics of the laser assembly of FIG. 1;

FIG. 1 is a schematic illustration of a laser assembly which may be employed in accordance with the concept and teaching of the present invention. A laser is disposed between mirrors $M_1$ and $M_2$ and may be of any suitable type such as a gas laser, or a liquid laser, or solid laser material. The distance between the mirrors $M_1$ and $M_2$ is L as indicated and to the right of mirror $M_2$, which is not totally reflective is a third mirror $M_3$, spaced at the distance $d$.

Figure 3:
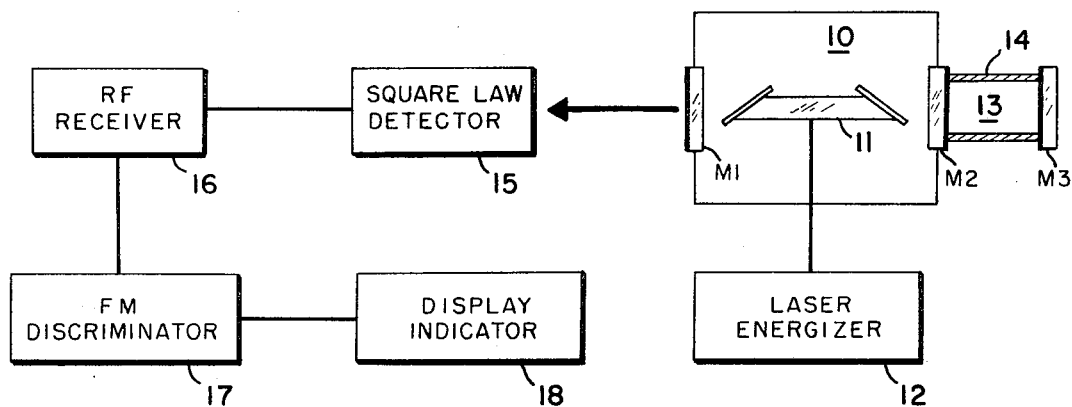
FIG. 3 is a schematic block diagram of a preferred embodiment of the present invention.

The laser assembly illustrated in FIG. 1 may be arranged to operate in two longitudinal modes producing a laser beam comprising two different frequencies emitted from either $M_1$ or $M_3$ which is arranged to be partially reflective for that purpose. One mode will provide a stable reference frequency and the other mode will produce a second frequency varying in response to change in the optical length $nd$ of the optically resonant cavity defined by mirrors $M_2$ and $M_3$, where $d$ is the physical distance, and $n$ is the index of refraction of the medium therebetween.

When the laser between mirrors $M_1$ and $M_2$ is energized from an appropriate source of excitation or pump energy, it will emit a laser beam as is conventionally known in the art. However, with the passive optically resonant cavity provided by the addition of the third mirror $M_3$, the entire laser assembly comprising active and passive optically resonant cavities as illustrated in FIG. 1, operates in a highly useful manner in accordance with the teaching of the present invention. The third mirror, $M_3$, can be considered together with the second mirror, $M_2$, as an optical resonator replacing the mirror $M_2$. To better illustrate the nature of the operation of the laser assembly illustrated in FIG. 1, the spectra of the resonant frequencies for axial laser and resonator modes are shown in FIGS. 2a and 2b. When the laser is driven slightly above threshold, two axial modes with frequencies $f_1$ and $f_2$ are generated in the laser portion of the laser assembly, which may be characterized as an "active" optically resonant cavity. By proper choice and disposition of the mirrors, including the resonator mirror $M_3$, additional resonant frequencies are developed which are characteristic of the optical resonator or passive optically resonant cavity portion of the laser assembly of FIG. 1, and having a frequency disposition as is indicated in FIG. 2b. The laser frequencies developed by the laser portion or active optically resonant cavity of the laser assembly of FIG. 1 are illustrated graphically in FIG. 2a which indicates intensity, "I," of the laser vs. frequency, $f$. FIG. 2b indicates the optical resonances of the passive optically resonant cavity or the resonator in terms of reflectivity, "R" vs. frequency, $f$, where $R = (R_3 \cdot R_2)^{1/2}$, and $R_3$ and $R_2$ are the reflectivities of $M_3$ and $M_2$, respectively.

As is shown in FIG. 2a, a plurality of resonant frequencies are capable of being developed by the laser or active optically resonant cavity, as indicated by the spectral disposition of numerous frequencies designated by dash-lines. The two frequencies $f_1$ and $f_2$, designated by solid lines are those which may be actually developed in the dual axial mode of operation. It should be noted that in accordance with the reflectivity "R" as shown in FIG. 2b, the axial mode frequencies $f_3$ and $f_4$ are more widely dispersed because the length of the laser, i.e. the distance L between mirrors $M_1$ and $M_2$, is considerably greater than the distance $d$ between the mirrors $M_2$ and $M_3$ comprising the resonator or passive optically resonant cavity.

By adjusting the optical length between mirrors $M_2$ and $M_3$, the passive optically resonant cavity can be tuned for resonance for one of the laser modes as is indicated typically by frequencies $f_1, f_2$ shown in FIG. 2a. Therefore, shifts in the laser frequency $f_2$ caused by small changes of the effective optical length of the passive optically resonant cavity can be detected by measuring the frequency difference between the two frequencies which are characteristic of the two laser modes. Detection of fluctuations in the laser beam may be accomplished by using a photo sensitive device to develop signals commensurate with the two frequencies, one of which is a constant frequency reference, and the other of which varies in accordance with variation in the effective optical length of the passive optically resonant cavity between mirrors $M_2$ and $M_3$.

The two mode operation developing two frequencies may be heterodyned to develop a beat frequency which will vary in accordance with the variation of the effective optical length of the passive optically resonant cavity defined by the mirrors $M_2$ and $M_3$. The optical length of the passive portion or resonator as illustrated in FIG. 1 may be defined as $nd$, where $n$ is the index of refraction of the medium between mirrors $M_2$ and $M_3$, and $d$ is the actual physical distance between the mirrors $M_2$ and $M_3$.

Accordingly, if the passive optically resonant portion of the laser assembly is arranged to intercept acoustic energy in the form of sound waves traversing across its major axis, the index of refraction of the medium contained therebetween will be changed in accordance with the instantaneous amplitude of the acoustic energy. The resultant change in effective optical length of the passive optically resonant cavity produces a concomitant change in the second frequency of the dual axial laser mode operation and is therefore a function of the sound wave traversely intercepted by the passive portion of the laser assembly as illustrated in FIG. 1.

Similarly, if acoustic energy in the form of sound waves impinges upon mirror $M_3$, substantially along the major axis of the laser assembly illustrated in FIG. 1, it will cause mirror $M_3$ to vibrate periodically with the pressure variations in the sound wave which, in turn, will produce periodic variations in the distance $d$ and hence periodic variations in the mode separation frequency. Thus, in the second manner of employing the present invention the variations in the mode separation frequency are detected by hetrodyning the two frequencies developed by the laser assembly and producing a beat frequency which is a function of the acoustic energy intercepted axially by the mirror $M_3$.

FIG. 3 is a schematic block diagram illustrating a preferred embodiment of the present invention employing a laser assembly of the type illustrated in FIG. 1 to produce its highly desirable results. In FIG. 3 a dual cavity laser assembly 10 is arranged and adapted to receive an active laser material within the envelope 11. Such active laser material may be a suitable gas, liquid, or solid substance. One preferred embodiment of the present invention employed a helium neon gas laser material.

The laser material 11 is coupled to an appropriate source of laser energy derived from a laser energizer 12 which may be electrical energy, other suitable excitation energy, or laser pump appropriate to the type and specific kind of material in the active laser cell 11. Thus, the laser 11 together with mirrors $M_1$ and $M_2$ comprises an active optically resonant cavity while that portion of the laser assembly between mirrors $M_2$ and $M_3$ may be referred to the passive portion of the laser assembly 10.

The passive optically resonant portion 13 of the laser assembly 10 may be enclosed in a suitable protective envelope so that it can be completely immersed in the medium wherein it is desired to detect acoustic energy. The output of the laser assembly 10 is directed to a photo-responsive means which may take the form of the square-law detector 15 as illustrated in FIG. 3. The laser beam comprising two frequencies wherein one of the frequencies is "pulled" in response to changes in the effective optical length of the passive optically resonant cavity 13, causes the square-law detector 15 to develop an output which is a function of the beat frequency between the two frequencies in the laser beam.

The beat frequency signal output of the square-law detector 15 is received by an RF receiver 16 which may be tuned to the particular frequency it receives and appropriately amplifies for connection as an input to a frequency modulation discriminator 17 which may be a conventional discriminator of the Foster-Seeley type, for example, a phase detector, or functionally equivalent circuit. The changes in frequency detected by the frequency discriminator 17 are commensurate with the changes in the effective optical length of the passive resonant cavity 13 and accordingly may be connected to an appropriate display indicator 18 such as a cathode ray oscilloscope for visual display of the detected sound waves.

As an example of the sensitivity of an embodiment of the present invention substantially as illustrated in FIG. 3 when employed as a hydrophone with the passive cavity 13 immersed in the liquid medium in which sound energy is to be detected may be demonstrated by the following relationships. Assuming that in air, the least displacement of mirror $M_3$ which can be detected is $1 \times 10^{-3}$ A, $$\Delta n d_0 = 1 \times 10^{-3} \text{ A} = 1 \times 10^{-11} \text{cm}.$$

Where $\Delta n$ is the smallest deviation in index of refraction detectable. For a cell length of 10 cm, a change in index of refraction of $1 \times 10^{-12}$ can be determined. When a sample of liquid is compressed, the fractional index of refraction change is given by $$(\Delta n/n_0) = (\Delta V/V_0). \tag{1}$$

Where $n_0$ and $V_0$ are the initial index of refraction and volume, respectively. The compressibility of a liquid is given by $$K = [\Delta V/V_0/\Delta P] \tag{2}$$

Where $\Delta P$ is the pressure required to produce $\Delta V$, then the relation between index of refraction fluctuation and pressure fluctuation in a sound wave in liquid where adiabatic compressibility is used for sound wave propagation may be expressed as $$\Delta n = n_0 \, \Delta P \, K. \tag{3}$$

For water the value of $K$ can be obtained from the velocity of sound, $v$, in $H_2O$ $$v = \sqrt{(1/K\rho)}, \tag{4}$$

where $\rho$ is the density.

Solving equation (4) for $K$, it is determined that $$K = (1/v^2\rho) \tag{5}$$

For $H_2O$, $v = 1{,}433$ m/sec; then $K = 4.85 \times 10^{-11}$ cm$^2$/dyne.

From equation (3) the sensitivity in terms of pressure is $\Delta P = (n/n_0 K)$ or $(10^{-12}/1 \times 4.85 \times 10^{-11}) = 0.0206$ dynes/cm$^2$, or 17 db below 1 dyne/cm$^2$.

The limiting sensitivity of the same type of device, for its use in air similarly assuming a cell length of 10 cm, can be calculated. Such sensitivity has been determined to be $1.50 \times 10^{-6}$ dynes/cm$^2$, or nearly 60db below 1 dyne/cm$^2$.

The sensitivity of a typical embodiment of the present invention in response to pressure received substantially along its longitudinal axis, thus displacing the mirror $M_3$ of the arrangement illustrated in FIG. 3, and thereby changing the effective optical length of the passive resonant cavity 13, has been calculated to be 1 ×

$10^{-3}$ A or $1 \times 10^{-11}$ cm. as has been previously stated.

Figure 4:
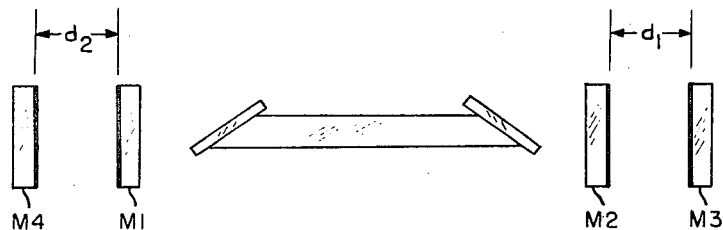
FIG. 4 is a schematic diagram of a variant arrangement of laser assembly which may be employed with the present invention.

FIG. 4 illustrates a laser assembly which operates on substantially the same principles as those previously described and in connection with the illustration of FIGS. 1 and FIG. 3, but is of a variant configuration. The laser assembly illustrated in FIG. 4 has a central active resonant cavity wherein a laser of suitable type is positioned and supported between the mirrors $M_1$ and $M_2$. A resonant cavity defined by the mirrors $M_2$ and $M_3$ and having a distance $d_1$ therebetween comprises one of two passive resonant cavities. The second passive resonant cavity is defined by mirrors $M_4$ and $M_1$, spaced with the distance $d_2$ therebetween. This type of laser assembly is operative in dual mode when properly adjusted substantially as described in connection with previously disclosed embodiments and can provide increased useful information in accordance with the concept and teaching of the present invention where it is required or desirable to detect acoustic energy from two directions. In this usage the two end mirrors would function as vibrating diaphragms. It should also be borne in mind that the concept of the present invention and its teachings are such that it may be practiced together with ring lasers or similar configurations of laser assemblies wherein at least one passive resonant cavity may be included for immersion in, or exposure to, a medium where it is desired to detect extremely weak acoustic energy signals.

It is important to appreciate that the initial adjustment of the laser assembly to give effect to the desired operation involves adjustment of gain of the laser to provide two mode operation and also adjustment of the passive optically resonant cavity to bring one of its characteristic resonant frequencies in substantial frequency alignment with one of the two modes as illustrated in FIGS. 2a and 2b.

Moreover, it is to be understood that appropriate anti-reflective coatings are preferably applied to elements of the optical portion of the embodiments described herein in accordance with known optical techniques to enhance and improve operation of the invention.

Obviously many modifications and variations of the present invention are possible in the light of the above teachings. It is therefore to be understood that within the scope of the appended claims the invention may be practiced otherwise than as specifically described.

What is claimed is:

1. A high sensitivity acoustic detector comprising:

a composite laser assembly having an active portion and at least one passive portion defining optically resonant cavities included between spaced reflective surfaces in common axial alignment, said passive portion being tuned and adjusted relative to said active portion for causing said laser assembly to develop laser energy in a dual mode of operation producing first and second frequencies in response to the energization of said active portion;

a laser material contained within said active portion, with said passive portion being positioned for intercepting sound waves to be detected;

means for energizing said laser material for developing laser energy producing said first and second frequencies, whereby intercepted sound waves change the optical resonance of said passive portion and the resultant second frequency as a function of the amplitude of said intercepted sound waves;

a photo-responsive means positioned to receive said first and second frequencies of laser energy for generating output signals commensurate with the instantaneous beat frequency between said first and second frequencies;

frequency-sensitive means for detecting changes in the frequency of said output signals; and means for indicating the changes in frequency detected by said frequency-sensitive means.

2. A high sensitivity acoustic detector as claimed in claim 1 wherein the passive portion of said composite laser assembly is positioned to receive sound waves substantially transversely to its laser beam axis.

3. A high sensitivity acoustic detector as claimed in claim 1 wherein said passive portion of said laser assembly is positioned for one of its reflective surfaces to be displaced substantially along the laser beam axis in response to sound waves impinging on said reflective surface.

4. A high sensitivity acoustic detector as claimed in claim 1 wherein said laser assembly comprises an active portion included between two passive portions disposed along the long axis of said assembly.

* * * * *